Patented Nov. 27, 1945

2,389,926

UNITED STATES PATENT OFFICE 2,389,926

PLASTIC SEALING CEMENTS

John D. Morgan, South Orange, and Russell E. Lowe, East Orange, N. J., assignors to Cities Service Oil Company, New York, N. Y., a corporation of Pennsylvania No Drawing. Application April 6, 1943, Serial No. 481,998

2 Claims. (Cl. 106—269)

This invention relates to bituminous cements. More particularly the invention relates to plastic asphaltic compounds for sealing structural joints.

There are many bituminous cements on the market which are used for waterproofing and repairing roofs, and as expansion joints for roads, sidewalks and the like, as well as calking compounds for structures such as door and window frames to seal the joint between the frames and the structure in which they are mounted. Such cements must make a permanent adhesive joint which will not open under expansion and contraction of the structures forming the joints. It is important also that the cements must be plastic to provide for expansion and should have such temperature characteristics that they will not flow out of joints when heated to comparatively high atmospheric temperatures. In addition to this the cements should be waterproof and must not oxidize and harden when exposed to the air.

The primary object of the present invention is to provide a plastic cement for sealing joints which is very adhesive and retains its plasticity over a wide temperature range.

Another object of the invention is to provide a bituminous joint sealing cement which is waterproof and which does not oxidize or harden by exposure to the air and sun.

With these and other objects in view the invention consists in the plastic sealing cement hereinafter described and particularly defined in the claims.

The preferred plastic sealing cement has a composition of asphaltic road oil 90 percent by weight and lithium stearate 10 percent by weight. It has been found that the proportion of road oil may vary between 70 and 90 percent while the stearate is varied between 30 and 10 percent.

An asphaltic road oil which has been found to be very satisfactory is made by topping Mexican Panuco crude oil and then blending or cutting back the topped crude oil with No. 2 furnace oil to make the finished road oil. The finished road oil consists of 87 percent of topped Panuco crude which has a flash of 180° to 200° F. Cleveland open cup with 13 percent of No. 2 furnace oil. The finished product has an A. P. I. gravity of approximately 13.6 and a flash of approximately 160° F. Cleveland open cup, with a viscosity of 191 at 122° F. Furol.

The No. 2 furnace oil which has been used is a product similar to a kerosene which has a flash of 115° to 170° F. Cleveland open cup, a distillation of 10 percent at 440°, 90 percent at 600°, and an end point of 650°.

A very important ingredient in the plastic sealing cement is the lithium stearate. This product has a very high boiling point and cannot be colloidally dissolved in the asphaltic road oil at temperatures below 400° F. The stearate furthermore has a very important viscosity modifying effect which tends to keep the cement in a stable plastic form. Furthermore, the stearate when colloidally dissolved in the road oil protects the road oil and makes it substantially non-oxidizing.

To make the composition the road oil is heated to 200° F. and lithium stearate is added while passing the material through a mixing machine which preferably is a homogenizing mixer. The heating and agitation continue until the mixture is raised to a temperature of 430° and is a colloidally dispersed mass. After the mixture has been heated and thoroughly mixed at a temperature at least as high as 430° F., it is run into chill pans and rapidly cooled in thin layers. After it has been congealed the product may be worked in a kneading machine to put it into plastic form for packaging.

It is found that by the homogenizing action the asphalt oil is the dispersed phase and the lithium stearate is the continuous phase. The continuous phase lithium stearate effectively coats the asphaltic material and protects it from oxidation. This colloidal disperson, however, is very adhesive and will adhere firmly to wood masonry structures, and metals so that it is well adapted for sealing all types of structural building joints.

Extensive experiments have been carried on to find whether other metallic soaps such as sodium potassium, calcium and aluminum stearates and oleates were suitable to replace the lithium stearate but it has been found that none of these soaps has the ability to protect the mixture against oxidation and none seems to form the same type of colloidal solution of the road oil.

The preferred form of the invention having been thus described, what is claimed as new is:

1. A plastic sealing cement consisting of asphaltic road oil of approximately 13.6 gravity viscosity of 191 at 122° F. Furol, and 160° F. flash blended with from 10% to 30% of commercial lithium stearate.

2. A plastic sealing cement consisting of asphaltic road oil consisting of 87 percent topped Panuco crude having a 13.6 gravity, an 180° 200° F. flash when diluted with No. 2 furnace oil having a 115° to 170° F. flash, a distillation of 10 percent at 440, 90 percent at 600, and 650 end point, such oil mixture being colloidally dispersed in from about 10% to 30% of lithium stearate.

JOHN D. MORGAN.
RUSSELL E. LOWE.